United States Patent
Mayerhoffer et al.

[11] 3,869,262
[45] Mar. 4, 1975

[54] FUEL AND ADDITIVE FOR THE PRODUCTION THEREOF

[75] Inventors: Herbert Mayerhoffer; Wilhelm Schneider; Hardo Nüring; Wolfgang Exner, all of Wien, Austria

[73] Assignee: Oesterreichische Hiag-Werke Aktiengesellschaft, Vienna, Austria

[22] Filed: May 5, 1972

[21] Appl. No.: 250,548

[30] Foreign Application Priority Data
May 5, 1971 Austria ............................. 3933/71
Nov. 24, 1971 Austria ............................ 10127/71

[52] U.S. Cl. .......................... 44/56, 44/70, 44/77
[51] Int. Cl. ............................................ C10l 1/18
[58] Field of Search ........................... 44/56, 70, 77

[56] References Cited
UNITED STATES PATENTS

| | | | |
|---|---|---|---|
| 1,331,054 | 2/1920 | Dinsmore | 44/70 |
| 1,557,257 | 10/1925 | LaRiboisiere | 44/56 |
| 1,848,063 | 3/1932 | Kimball | 44/56 |
| 2,046,243 | 6/1936 | Buc | 44/56 |
| 2,114,676 | 4/1938 | Contardi et al. | 44/56 |
| 2,237,660 | 4/1941 | Ellis | 44/70 |
| 2,240,040 | 4/1941 | Hooton | 44/56 |

*Primary Examiner*—Daniel E. Wyman
*Assistant Examiner*—Y. H. Smith
*Attorney, Agent, or Firm*—Sughrue, Rothwell, Mion, Zinn & Macpeak

[57] ABSTRACT

An improved fuel for use in internal combustion engines comprising gasoline and at least one, and preferably at least three, oxygen-containing compounds of the general formula:

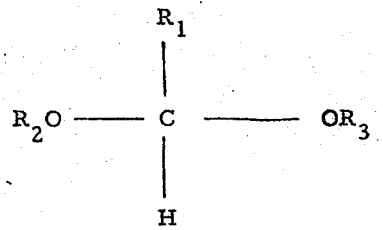

wherein $R_1$ is H or $CH_3$ and $R_2$ and $R_3$ are each $CH_3$, $C_2H_5$, $C_3H_7$ or $C_4H_9$. The exhaust gases from an engine using the disclosed fuel contain a reduced amount of carbon monoxide.

15 Claims, 4 Drawing Figures

FUEL AND ADDITIVE FOR THE PRODUCTION THEREOF

BACKGROUND OF THE INVENTION

1. Field of the Invention

The invention relates to a fuel with a reduced CO content in the exhaust gas when operating internal combustion engines with said fuel having an approximately constant heating value and containing compounds with an oxygen content such as acetals and alcohols and other liquids miscible with commercial gasolines.

2. Description of the Prior Art

The composition of the exhaust gases from internal combustion engines is primarily dependent on the fuel-air ratio, i.e., the air count. The air count $\lambda$ expresses the ratio of the actual amount of air present during combustion to the stoichiometrically required amount of air.

$\lambda$ = effective amount of air/stoichiometric amount of air

The standard amount of air for the practical operation of vehicle engines is determined both by the nature of the engine construction and the operating conditions of the combustion engine and is approximately between 0.85, i.e., air deficiency and 1.1, i.e., excess of air. The maximum capacity (performance) is obtained when $\lambda=0.85$ and the minimum consumption when $\lambda = 1.1$.

Even when the engine is engaged with great care this ratio cannot be prevented from altering according to the revolution count and loading of the motor and as a result, portions of unburned fuel as well as CO and other combustion products occur in the exhaust gases. In the case of combustion engines the carburetor generally operates in a region in which somewhat less than the stoichiometric amount of combustion air is added and yet the engine produces a good performance and acceleration. An exhaust gas with a high CO content is produced from such a gas mixture during combustion in the engine. All combustion engines in operation at present, in particular Otto carburetor engines produce exhaust gases depending on their operating condition, which contain a substantial portion of poisonous constituents.

Furthermore, the performance of a combustion engine (otto engine) is determined by compression. Increased compression produces higher combustion temperatures and thus greater delivery pressures and a higher degree of efficiency. To operate Otto motors with high compression it is necessary to add to the fuel so-called fuel inhibitors (knock suppressors), in particular organic lead compounds such as tetraethyllead (TEL) or tetramethyllead (TML). The sharp increase in motor traffic represents a risk to public health as a result of the harmful substances contained in the exhaust gases. These harmful substances being in particular, carbon monoxide (CO), nitric oxide ($NO_x$), unburned hydrocarbons $(CH_x)_y$, aldehydes, cracking products and lead. Although the toxicity of some substances such as lead is still being disputed, legislators in many countries (USA, West Germany, Switzerland, Austria, etc.,) have seen fit to restrict the content of harmful substances in the exhaust gases as well as the amount of lead and aromatic substances in fuel.

Figure 4:
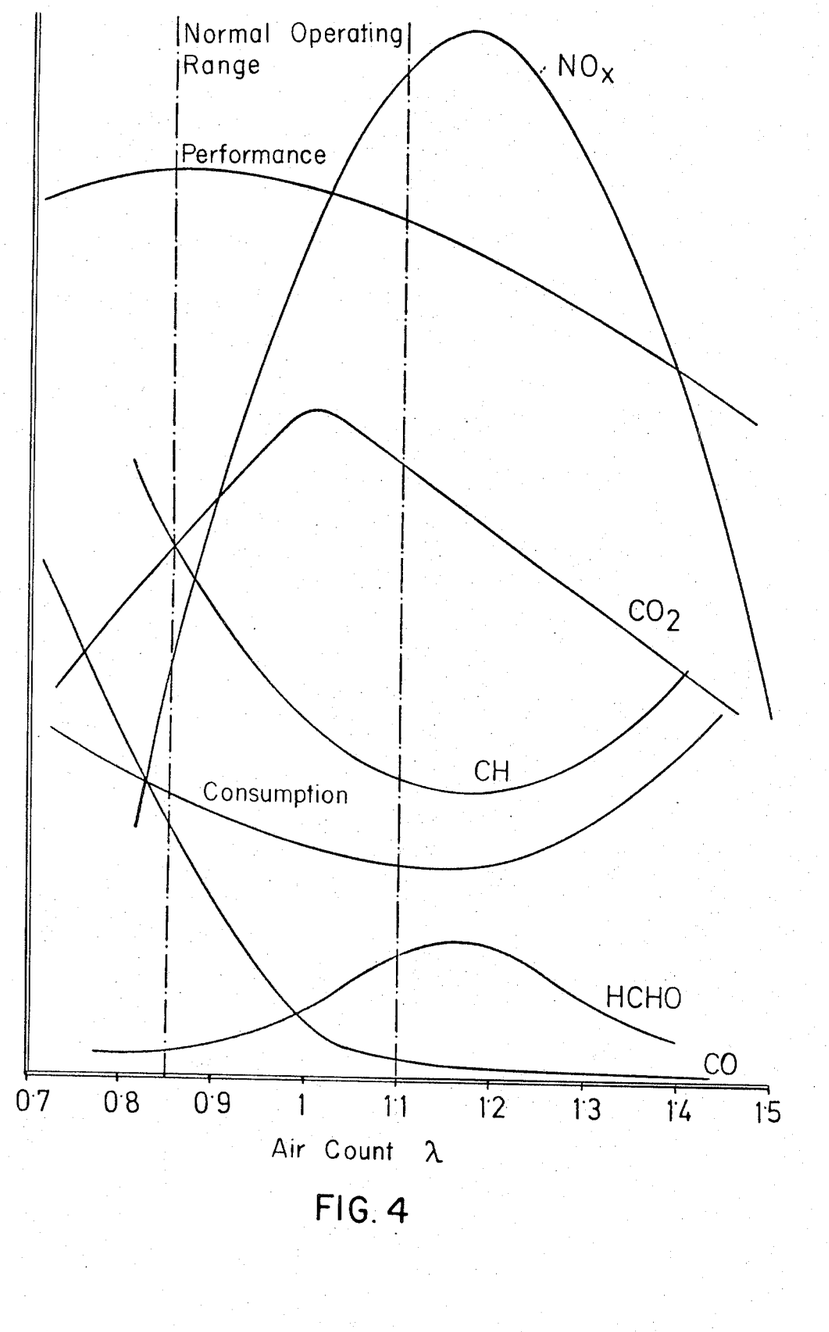
FIG. 4 is a phase diagram for an Otto engine.

Many attempts have already been made to achieve the minimal amounts of harmful substances required by legislators. As yet measures relating purely to the construction of the engine have not met with any substantial success. This will be explained by considering the phase diagram of an Otto engine from an ideal point of view and with electronic injection. In this diagram the content of individual harmful constituents is illustrated in dependence on the air count (FIG. 4).

From this diagram it will be noted that the $CO_2$ content reaches a maximum with the air count 1, the content of CO a minimum. The amount of $(CH_x)_y$ is at a minimum with an air count of 1.15. At this point the content of $NO_x$ and aldehydes reaches a maximum. As combustion is only good from $\lambda 0.85$ to 1.1 this range is also the best with regard to performance and consumption. Outside of this range a decrease in capacity and an increase in consumption may be noted. In addition the diagram also shows the dependence of the harmful substances on one another in terms of chemical equilibrium. Thus with a specific air count each magnitude of the individual constituents is provided, i.e., with the same fuel. As fuels are standarized — from an international point of view — they only differ slightly in the C/H ratio (relation). The $NO_x$ content is a function of the combustion temperature, resulting from the air count. Nitric oxides have long been known in chemical terminology on account of their catalytic action in oxidation reactions. They are known for example, from the lead chamber process in the oxidation of $SO_2$ to $SO_3$, from the process of the Gutehoffnungshutte for the oxidation of methane to form formaldehyde, from the Monsanto Chemical Co. process for the oxidation of aliphatic hydrocarbons to form formaldehyde, acetaldeyhde, acetone, alcohols, etc. The catalytic action of $NO_x$ is thus also a factor of combustion in the Otto engine as 0.1 vol. % amounts suffice as catalytically effective quantities in technical processes at low temperatures such as those which occur in otto engines. The combustion process in the Otto engine is not only a function of the air count but also a function of the combustion speed of the fuel.

In dirty engines combustion is incomplete. It should also be noted that the turbulence during combustion, which depends on the revolution count is noticeable when attaining equilibrium.

According to the law of mass action the state of equilibrium during a reaction can only be altered by the pressure and/or temperature being altered given equal reactants. Thus from these considerations it follows that the composition of the exhaust gas can only be altered if a. the fuel is changed or
b. the compression of the engine is reduced.

Reducing compression results in a deterioration in performance. The performances of most European vehicles would be reduced to such an extent that they no longer satisfy requirements.

Another method for dealing with the harmful substances in exhaust gas consists in mixing the gas with air after it leaves the engine and burning the harmful substances. To make this afterburning possible it is necessary for the exhaust gas to be sufficiently hot for the catalytic combustion to be maintained. The method of effecting ignition for this purpose is not suitable for reasons of economics and performance. Furthermore a corresponding amount of air has to be compressed and mixed with the exhaust gas. The result is a reduction of performance with an increase in fuel consumption. The cyclic operation of a motor vehicle renders the value of such afterburning as extremely questionable. Catalysts only work satisfactorily under accurately defined constant conditions. It is not likely that a cold catalyst will function when starting the engine in winter with, for example, an outside temperature of −20°C, when for reasons of necessity a fatty fuel is used. Catalysts known to date are only effective at high temperatures.

Successful attempts have been made to increase the combustion process in the engine and thus the capacity and duration of the engine by means of certain additives. An important example of such as additive is tetraethyllead which, even in small quantities, considerably improves the antiknocking property of gasoline and thus protects the engine. As a result all kinds of lead compounds which are injurious to health occur in the exhaust gas. The elimination of these compounds is ugently required.

Aniline, inter alia, was proposed in an attempt to replace tetraethyllead by a substance which produces a non-noxious exhaust gas. This has a good antiknocking action and is compatible with other fuel additives. However it has recently been shown that, contrary to earlier assumptions, aniline and its derivatives cause very large deposits of gum-like residue in the engine and suction lead so that the addition of these substances to the fuel seems rather questionable.

Thus the only practical way which remains is to alter the combustion itself by suitable measures so that the content of harmful substances is reduced. If compression remains constant this can only be effected by reducing the air requirement and the combustion temperature with the aid of oxygen-containing compounds. In addition, by using oxygen-containing compounds with a greater combustion speed, combustion equilibrium can be more rapidly achieved and thus the efficiency further increased.

Only a few of the many organic oxygen-containing compounds can be termed suitable for use as an additive for economic and physical reasons. The additive must not alter the fuel to such an extent that it no longer complies with the standards. Furthermore, the minimal quantities must be as effective as possible.

It is known that by the addition of oxygen-containing compounds, especially alcohol, an improvement in combustion and thus in knocking behavior, is obtained. On account of the danger of separation at low temperatures it is not possible to add alcohol alone.

During fuel crises it has already been proposed to replace gasoline, at least partially by other substances, most particularly low alcohols and other oxygen-containing compounds. Such proposals are found in the Swiss PS No. 238,693 in the French PS No. 890,651 and in the German patent specifications Nos. 819,176 and 822,031. The fuels mentioned herein are "Ersatz" fuels (substitute fuels) which are not suitable for the operation of modern combustion engines. The amount of gasoline they contain is from 0 to 70 volume % at the most. Their heating value is low and amounts to from 4,000 to 9,000 Cal. as compared to 10,000 to 10,700 Cal. in standard fuels. For the necessary stabilization of the gasoline-alcohol mixtures the addition of solubilizers such as acetals, was proposed. These always had to be present in quantities of more than 10 Vol. % to keep corresponding quantities of alcohol at low temperatures in a dissolved state.

On examining these earlier proposals as to their suitability for reducing the CO content it has been shown that on account of the low heating value of the fuels it was impossible or only marginally possible to keep the engine running and thus for this reason the problem in question could not be solved with the aid of these proposals.

SUMMARY OF THE INVENTION

The present invention relates to a fuel, having practically the same heating value as standard fuels but with a substantially lower CO content in the exhaust gas during combustion.

According to the invention this fuel is characterized in particular in that it contains 0.2 to 12, more particularly 0.5 to 10 vol. % of compounds of the general formula in which $R_1 = H$ or $CH_3$, $R_2 = CH_3, C_2H_5, C_3H_7$ or $C_4H_9$ and $R_3 = CH_3, C_2H_5, C_3H_7$ or $C_4H_9$ as well as solubilizers and auxiliary agents and water if necessary. Preferably, the fuel of the present invention contains, in the above amounts, at least three compounds an acetal and at least two members selected from the group consisting of alcohols, acetals and acetates, wherein each of said compounds has from 1 to 7 carbon atoms.

DESCRIPTION OF THE PREFERRED EMBODIMENTS

The fuel may be composed on the basis of all commercial fuels irrespective of whether these have been mixed with certain additives serving various purposes such as increasing the anti-knocking property or corrosion resistance. The fuel may or may not be leaded.

The fuel according to the invention may also be obtained by adding a supplementary mixture to the gasoline. Alternatively the individual constitutents may be added to the gasoline in any desired order. Generally it is advantageous to add an appropriate mixture all at once or the individual constituents separately to the gasoline in the refinery.

It is also possible to use blends of commercial gasolines on their own or with other hydrocarbon fractions as the fuel base. It is not necessary for the fuel according to the invention to contain only the new additive. Advantageous embodiments of the fuel contain other active substances serving various purposes.

In other words, one skilled in the art may employ the present fuel additive with any known fuel additive and in any known prior art gasolines. The particular gasoline is not critical to the present invention, with, generally, all commerical gasolines being operable.

Although the fuel according to the invention is compatible with such known additional substances and these can thus be added to the gasoline in the usual way in the presence of the new additive it should be noted that the fuel according to the invention also possesses to a lesser or greater extent the effects of almost all known additives in addition to the advantages already mentioned. It has been found that it possesses an improved anti-knocking property, that it has a reduced nitric oxide content in the exhaust gas, that it clears the engine of resinous deposits, that it does not allow the accumulation of water, particularly in the carburetor, that it carries away water from the tank and the carburetor, that it prevents icing on the carburetor, acts as an anti-corrosive and that the new additive brings about an increase in the value of low grade fuels.

Furthermore, the use of the fuel according to the invention requires no modification of the engine construction for it to be used economically in a lead free state.

The fuel according to the invention can thus be used in high compression engines. The admixture of the additive to the fuel can take place in the refinery without any expensive modification of installations. A reduction in the use of aromatics in the gasoline can be obtained by way of the additive introduced according to the invention on account of its anti-knocking properties.

Particularly good results can be obtained with the fuel according to the invention if it contains aniline or one of its derivatives, more particularly methylaniline as an anti-knocking agent instead of tetraethyl-lead. A particularly important feature of the invention consists in that it constantly carries away resinous deposits in the engine and thus cleans the engine. similarly it prevents any new formation and deposition of such substances so that the existing difficulties with regard to the use of aniline or its derivatives as an anti-knocking agent are thus eliminated by the simultaneous use of this fuel and aniline.

The fuel according to the invention has improved combustion properties so that no performance reduction is to be observed as a result of the additive although the total heating value of fuel which is refined by the additive is slightly reduced.

It has also been found that the CO content in the exhaust gas is considerably reduced if the additive of the fuel according to the invention consists essentially of at least three oxygen-containing compounds, i.e., a $C_1$–7 acetal and at least two compounds selected from the group consisting of $C_1$–7 alcohols, $C_1$–7 acetals and $C_1$–7 acetates. The selection of appropriate combinations of at least three of these compounds corresponding to the above formula can be made such that the boiling curve of the combination substantially approximates the boiling curve of the base gasoline within the temperature range of from 40° to 130° C. Examples of such mixtures are:

dimethylformal, methanol and isopropanol; dimethylacetal, methanol and isobutanol; dimethylformal, methanol, isopropanol and paraldehyde; dimethylformal, methylacetate and isobutanol; dimethylacetal, methanol, diisopropylformal and isopropanol; diethylacetal, methanol, ethanol, isobutylacetate and paraldehyde and similar mixtures.

The following can be given as non-limitative examples of the volumetric composition of suitable additive mixtures consisting of three or more oxygen-containing compounds, at least one of which corresponds to the formula indicated above: 40 parts by volume dimethylformal, 40 parts by volume methanol, 20 parts by volume isopropanol; 20 parts by volume dimethylacetal, 20 parts by volume diethylacetal, 30 parts by volume isopropanol, 30 parts by volume diisopropylformal; 30 parts by volume dimethylformal, 30 parts by volume methanol, 20 parts by volume isopropanol 20 parts by volume isobutanol; 30 parts by volume dimethylformal, 30 parts by volume methanol, 20 parts by volume isopropanol 20 parts by volume paraldehyde; 20 parts by volume methyl acetate, 20 parts by volume methylal, 30 parts by volume methanol, 20 parts by volume isopropanol, 10 parts by volume paraldehyde of the like. The methanol content can be up to 60 volumetric % of the mixture to be added. The isopropanol content up to 40 volumetric %.

Although all compounds of the above formula are effective in the way indicated, the low molecular weight compounds which contain one or more methyl groups are preferred to the high molecular weight compounds.

By using these low molecular weight compounds there is a clear increase in the RON (research octane number) as will be shown below, as compared to the same characteristic value of the initial gasoline so that it is possible to replace the anti-knocking agent which would otherwise be used at least partially and frequently completely by the fuel additive according to the invention.

On account of the increase in the octane number due to the additive according to the invention an organic lead compound can generally be omitted from the admixture or can be replaced by the addition of aniline or one of its derivatives. As a result not only the known advantages from aniline addition are obtained but catalytic afterburning is also made possble if this is desired, as there are no longer any lead compounds in the exhaust gas which might poison the catalyst. Another compound can be used in place of aniline as fuel inhibitor.

It has been found that very good results are obtained with an additive according to the invention, the composition which is such that when it is added in an amount of 5 to 12 volumetric % the ratio of its partial pressure at all temperatures in the boiling range of the fuel it is in to the partial pressure of the fuel is approximately the same. Thus in the case of a multicylinder engine with an inverted-type carburetor the dispersion of the fuel in the gas-air mixture is such that those cylinders which are furthest away from the carburetor receive a mixture which is rich in low boiling components of the fuel whereas those cylinders which are located adjacent to the carburetor receive a mixture rich in high boiling components of the fuel. The additive according to the invention is particularly effective if it participates in this dispersion, so that the ratio (relation) of the partial pressure of the fuel to the additive is approximately the same in every part of the fuel or in every boiling or evaporation (vaporization) fraction of the same.

The fuel according to the invention is advantageously so composed that the boiling (point) curve of the refined fuel coincides approximately with that of the unrefined fuel.

Examples of the two last mentioned embodiments are fuels which contain additives with the following volumetric compositions in addition to standard gasoline: 20 parts by volume methylacetate, 18 parts by volume methylal, 30 parts by volume methanol, 20 parts by volume isopropanol, 10 parts by volume paraldehyde and 2 parts by volume water; 30 parts by volume methanol, 10 parts by volume methylal, 30 parts by volume methylacetate, 20 parts by volume isopropanol and 10 parts by volume paraldehyde.

It was found that not only "Ersatz" (substitute) fuels with high contents of the effective constituent according to the invention can contain a few percent of water — as was already known — but the fuel according to the invention can also advantageously contain water. Its water content may vary in quantity according to the composition of the fuel, more particularly according to its content of aromatics and the temperature at which the gasoline refined with the additive is to be stored. Advantageously it varies within the limits of 0.0002 to 0.4 volumetric % relative to the total amount of fuel.

If only one compound is added to the fuel, it may happen that not only the benefits mentioned above, but also unfortunate consequences may result, for example, decomposition in cold wheather, icing, corrosion, etc.

A mixture has now been found which not only has a favorable influence in the desired sense on combustion when it is added to the fuel but it also has other marked advantages;

Such a fuel according to the invention contains a mixture of:

35 to 45 by volume methylal
35 to 45 parts by volume methanol
15 to 25 parts by volume isopropanol and preferably
10 to 125 parts by volume aniline or its derivatives, more particularly methylaniline, if necessary together with other standard fuel additiives.

The composition of the mixture is such that both the physical requirements, i.e., miscibility with gasoline, the antifreezing properties of the mixtures with gasoline and the chemical requirements, i.e., lower air requirements, a lower combustion temperature and a high combustion speed, are fulfilled. In this way the $NO_x$ content is correspondingly reduced by the lower combustion temperature, the mass equilibrium is improved by the low air requirement and chemical equilibrium is obtained more rapidly as a result of the high combustion speed. Merely by adding 5 volumetric % of the mixture to the fuel, a reduction of up to 30% of the CO content, up to 20% of the $NO_x$ content and up to 80% of the aldehyde content is obtained. The percentage of unburned hydrocarbons does rise by 10 to 20% consequent on the state of equilibrium but this only varies within the ppm range. The improvement in the exhaust gas extends to all states of practical operation.

Instead of lead, aniline (or its derivatives) which is known as a fuel inhibitor is added to the fuel according to the invention. Aniline has not been used hitherto on account of its gumming of the carburetor and suction system and fouling of the storage tank. However, when a lead-free base gasoline and 5 to 10% of the mixture given above as well as 1.25 to 2.5 volumetric % aniline were combined, an increase of up to 11 in the octane number was obtained. In addition the gum formation of a commercial fuel was reduced by half. No fouling was ascertained during the practical operation of a motor vehicle over 1 year. Analysis of the exhaust gas from fuels according to the invention containing an additive and aniline surprisingly showed that the addition of aniline (or its derivatives) does not influence the quantity of harmful substances contained therein. There were no more nitric oxides or aldehydes present than without the addition of aniline. This indicates that the combination of the fuel according to the invention and aniline makes it possible to omit the lead compounds.

A very important fact regarding practical application is that even with 15 volumetric % of the additive according to the invention no essentail decrease in performance was observed. Consumption also remains the same. A further advantage of the fuel according to the invention consists in that the amounts of water occurring during practical operation are dissolved and thus trouble arising from water in the tank can no longer occur.

As a result of the omission of lead compounds it is possible to produce fuels with standard antiknocking properties by using the fuel according to the invention with aniline (or its derivatives, for example methylaniline) without increasing the aromatic portion. It is known that $\beta$-benzopyrene which causes cancer is produced by the burning of aromatics. Thus it is recommended both in the USA and West Germany that the aromatic content whould not rise above the 25 volumetric % which is standard today. Furthermore, the aromatics are valuable raw materials for the chemical industry.

Thus the present invention makes it possible to produce lead-free fuels in which standard basic gasolines can be used unaltered. Engines can be operated on the fuels treated with the additive according to the invention and aniline (or its derivatives) without any constructional modification of the engine and without any loss in capacity or increase in fuel consumption. In addition the harmful substances are substantially reduced.

It is possible to reduce the harmful substances to zero without making any constructional modifications or adding detergents by using hydrocarbons as fuel. The content will regulate itself according to the laws of nature within the scope of the air ratio used in practical operation. All measures such as lean adjustment, afterburning, admixture of exhaust/gas, etc., only cause higher consumption and a reduction in capacity and thus represent unwarranted expenditure. For this reason the present invention provides the only possibility of obtaining the lowest amounts of harmful substances with maximum use of the fuel energy.

The following procedure was adopted to test the examples of embodiments of the fuel according to the invention:

The fuel with the additive was supplied to the engines of motor vehicles disposed on a dynamometer test stand which was set up for testing vehicles with an axial pressure of up to 10 tons, an energy of up to 200 horsepower on the circumference of the wheel and a speed on the roller of up to 200 kilometers/hour, the airsteam being produced by a blast machine. The driving behavior for all operating conditions which occur on the road can be simulated on this stand. The fuel mixtures were tested with different makes and types of vehicles. The behavior of the fuel mixtures according to the GIS (German Industry Standards) and the ASTM regulations which were in force at the time, was also tested. in addition, the fuel inhibition and composition of the exhaust gas, more particularly the CO content — the latter by infra red analysis — was gauged or tested by means of a CFR–4 engine with electronic injection. The values were determined with calibrated analyzers and written down. In addition to this data the oil and water cooling temperature and the tractive force of the engine were constantly measured in terms of Kp and noted down. Acceleration and consumption were also measured.

Unless there is indication to the contrary the figures given in the following examples relate to full load of the engine. The octane number was determined with test engines according to GIS 51,756 or ASTM D–908 and D–937.

The individual constituents of the additive according to the invention are not considered chemically as pure substances but are technical products of standard commercial quality. It is obvious that the individual substances do not have to be added to the fuel as mixture but can also be added individually one after the other. This applies in particular to the aromatic amines introduced as a fuel inhibitor.

The following examples serve to illustrate the present invention in more detail without representing any limitation of same.

EXAMPLE 1

5 volumetric % of a mixture of 80 parts by volume methylal $(CH_3O)_2 \cdot CH_2$ 20 parts by volume isopropanol, $(CH_3)_2 \cdot CH \cdot OH$.

was added to a standard commercial gasoline with a boiling range of 35° to 200°C, a density of 0.731/15°C, an octane number of RON 88 and a heating value of 10,200 Cal. The fuel now had a heating value of 9820 Cal. Its octane number (anti-knocking property) had risen to RON 91 whereas the CO content in the exhaust gas had decreased from 4.65 volumetric % to 3.75 volumetric %. its turbidity point was –30°C. (Cloud point).

EXAMPLE 2

10 volumetric % of a mixture of 30 parts by volume methanol, $CH_3OH$ 60 parts by volume dimethylacetal, $(CH_3O)_2CH \cdot CH_3$ 10 parts by volume i-butanol, $C_4H_9 \cdot OH$ was added to the standard gasoline of Example 1. The fuel now had a heating value of 9660 Cal. Its octane number had risen to RON 93.5 whereas the CO content in the exhaust gas fell from 4.65 volumetric % to 1.85 volumetric %. Its turbidity point was –30°C. (Cloud point).

EXAMPLE 3

7.5 volumetric % of a mixture of 30 parts by volume methanol, $CH_3OH$ 50 parts by volume methylal, $(CH_3O)_2 \cdot CH_2$ 10 parts by volume dimethylacetal, $(CH_3O)_2CH \cdot CH_3$ 10 parts by volume isopropanol $(CH_3)_2CH \cdot OH$ was added to a lead-free standard gasoline containing no additives, having a boiling range of 35° to 200°C, a density of 0.734, an octane number RON 77 and a heating value of 10,250 Cal. The fuel now had a heating value of 9870 Cal. Its octane number had risen to RON 82.5 whereas the CO content in the exhaust gas had decreased from 4.90 volumetric % to 2.7 volumetric %. Its turbidity point was –30°C (Cloud point).

EXAMPLE 4

7.5 volumetric % of the additive given in Example 3 as well as 1.25 volumetric % of aniline was added to the gasoline indicated in Example 3. The fuel now had a heating value of 9850 Cal. Its octane number had risen to RON 85 whereas the CO content in in the exhaust gas had fallen from 4.9 to 2.7 volumetric %.

EXAMPLE 5

10 volumetric % methylal was added to a commercial super gasoline having a boiling range of 35° to 195°C, a density of 0.752/15°C, an octane number RON 98 and a heating value of 10,500 Cal. The fuel now had a heating value of 9820. Its octane number had risen from RON 98 to RON 100, whereas the CO content in the exhaust gas fell from 4.50 volumetric % to 2.10 volumetric %. Its turbidity point was –30°C. (Cloud point).

EXAMPLE 6

5 volumetric % of a mixture of 30 parts by volume methanol, $CH_3OH$ 60 parts by volume diethylformal, $(C_2H_5O)_2CH_2$ 10 parts by volume isopropanol, $(CH_3)_2CH \cdot OH$ was added to the super gasoline according to Example 5. The fuel now had a heating value of 10,290 Cal. Its octane count increased to RON 99 whereas the CO content in the exhaust gas decreased to 3.35 volumetric %. Its turbidity point was –30°C. (Cloud point).

EXAMPLE 7

10 volumetric % of a mixture of 80 parts by volume diethylacetal $(C_2H_5O)CH \cdot CH_3$ 20 parts by volume isopropanol $(CH_3)_2 \cdot CH \cdot OH$ was added to a non-leaded super gasoline which was not blended with any additives and which had a boiling range of 35° to 195°C, a density of 0.754/15°C, an octane number RON 89.0 and a heating value of 10,450 Cal. The fuel now had a heating value of 10,140 Cal. Its octane number had risen to 94.5 whereas the CO content in the exhaust gas fell from 3.90 volumetric % to 1.75 volumetric %. Its turbidity point was –30°C. (Cloud point).

EXAMPLE 8

10 volumetric % of a mixture of 20 parts by volume methanol $CH_3OH$ 70 parts by volume methylal $(CH_3O).CH_2$ 10 parts by volume isobutanol, $C_4H_9OH$ was added to the gasoline according to Example 7. The fuel now had a heating value of 9830 Cal. Its octane number had increased to RON 94.0 whereas the CO content had decreased from 3.90 volumetric % to 1.05 volumetric %. Its turbidity point was –30°C. (Cloud point).

EXAMPLE 9

5 volumetric % of a mixture of 30 parts by volume methanol
20 parts by volume methylal
30 parts by volume methylacetate
20 parts by volume isopropanol was added to a fuel consisting of 10 parts by volume petrol ether having a boiling range of 40° to 60°C, 10 parts by volume gasoline fraction with a boiling range of 60° to 80°C, 20 parts by volume gasoline fraction having a boiling range from 80° to 120°C, 20 parts by volume gasoline fraction with a boiling range from 100° to 140°C, 10 parts by volume of a test gasoline fraction having a boiling range from 140° to 200°C, 10 parts by volume benzene, 10 parts by volume toluene, 10 parts by volume xylene, said fuel having an octane number RON 68 and a heating value of 10,620 Cal. The fuel now had a heating value of 10,380 Cal. Its octane number increased to RON 73 whereas the CO content in the exhaust gas decreased from 2.9 to 2.0 volumetric %. Its turbidity point was −30°C. (cloud point).

EXAMPLE 10

10 volumetric % of a mixture as described in Example 9 was added to the fuel also according to Example 9. The fuel now had a heating value of 10,040 Cal. Its octane number rose to RON 75 whereas the CO content of the exhaust gas fell from 2.9 volumetric % to 1.1 volumetric %. Its turbidity (cloud) point was −29°C.

EXAMPLE 11

10 volumetric % of a mixture as described in Example 9 as well as 1.25 volume % aniline was added to the fuel according to Example 9. The fuel now had a heating value of 10,020 Cal. Its octane number increased to RON 84 whereas the CO content in the exhaust gas decreased from 2.9 volumetric % to 1.1 volumetric %. Its turbidity point was below −30°C. (Cloud point).

EXAMPLE 12

10 volumetric % of the mixture given in Example 9 as well as 1.25 volumetric % aniline was added to the gasoline indicated in Example 3. The fuel now had a heating value of 9680 Cal. Its octane number rose to RON 88 whereas the CO content in the exhaust gas decreased from 1.21 to 0.21 volumetric %. Its turbidity point was −30°C. (Cloud point).

EXAMPLE 13

2 volumetric % of a mixture of
20 parts by volume methylacetate
18 parts by volume methylal
30 parts by volume methanol
20 parts by volume isopropanol
10 parts by volume paraldehyde
2 parts by volume water was added to a standard commercial gasoline with a boiling range of 35° to 200°C, a density of 0.731/15°C, an octane number RON 88 and a heating value of 10,200 Cal. The fuel now had a heating value of 10,100 Cal. Its octane number increased to RON 88.5 whereas the CO content in the exhaust gas decreased from 2.30 to 1.84 volumetric %. The tractive force of the engine remained unchanged at 52 Kp (Cp).

EXAMPLE 14

The test according to Example 13 was repeated with 12 volumetric % of the mixture being added to the gasoline. The fuel now had a heating value of 9580 Cal. Its octane number increased to RON 94.4 whereas the CO content decreased from 2.30 to 0.34 volumetric %. The tractive force of the engine decreased from 52 to 50.5 Kp (CP).

EXAMPLE 15

Figure 1:
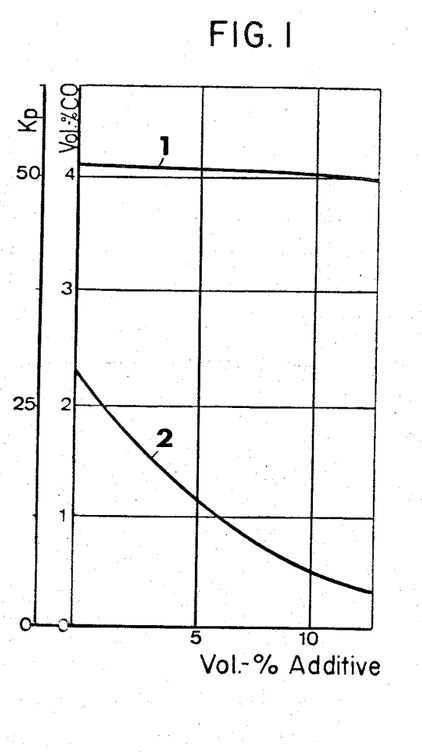
FIG. 1 shows the relationship between the amount of additive of the present invention of Examples 13 and 14), the CO content in the exhaust gases and the tractive force of the engine.

The relationships during the addition of the mixture given in Examples 13 and 14 to the standard commercial gasoline are represented in more detail in the graph of FIG. 1 of the drawing. In the drawing the amount of mixture added in terms of volumetric % is indicated on the abscissa. On the one ordinate the tractive force of the engine in terms of Kp (Cp) and on the other ordinate the CO content in the exhaust gas in terms of volumetric % are indicated. The course of the curves shows that with an increasing amount of additive the CO content (curve 2) in the exhaust gas decreases rapidly whereas the tractive force (curve 1) which is a measurement for the capacity remains practically the same.

The above-mentioned results were also ascertained in cases in which the heating values of the additive-free fuel and the fuel mixed with the additive were considerably further apart — as is the case of Examples 13 and 14. It is assumed that the reason for this behavior is the increased combustion to $CO_2$ with the presence of the additive.

EXAMPLE 16

5 volumetric % of a mixture of 30 parts by volume methanol, 10 parts by volume methylal, 30 parts by volume methyl acetate, 20 parts by volume isopropanol, 10 parts by volume paraldehyde and 1.25 volumetric % aniline was added to a lead-free standard gasoline, which contained no additives and had a boiling range of 35° to 200°C, a density of 0.734/15°C, an octane number RON 77 and a heating value of 10,250 Cal. The fuel now had a heating value of 9980 Cal. Its octane number increased to RON 83 whereas the CO content in the exhaust gas decreased from 2.5 to 1.05 volumetric %.

EXAMPLE 17

Example 16 was repeated with 2.5 volumetric % aniline being added instead of 1.25. The fuel now had a heating value of 9960 Cal. Its octane number increased to RON 87 whereas the CO content in the exhaust gas decreased from 2.5 to 0.52 volumetric %.

EXAMPLE 18

Figure 2:
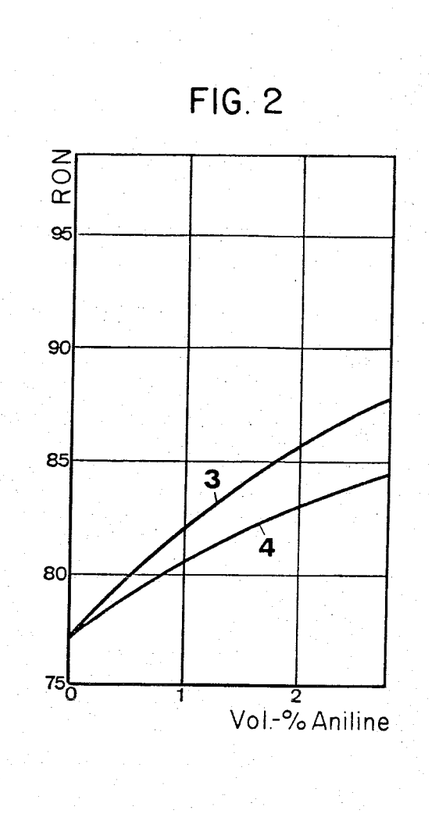
FIG. 2 illustrates a comparison between replacing ethyl lead in a commercial gasoline with both aniline (curve 4) and an additional amount of the additive of the present invention (curve 3), with respect to the octane number of the fuel.

The relationships when proceeding according to Examples 16 and 17 but with different aniline contents are illustrated in more detail by the graph of FIG. 2 of the drawing. The amount of aniline added in terms of volumetric % is indicated on the abscissa and the RON on the ordinate. Curve 4 incorporates the values obtained with gasoline when only aniline is added in place of ethyl lead. Curve 3 shows the considerably improved anti-knocking properties obtained when the gasoline was mixed with an additional 5 volumetric % of the additive given in the example.

EXAMPLE 19

7.5 volumetric % of a mixture of 33.0 parts by volume aniline, 19.0 parts by volume methanol, 6.7 parts by volume methylal, 19 parts by volume methylacetate, 13.4 parts by volume isopropanol, 6.7 parts by volume paraldehyde, and 2.2 parts by volume water was added to the lead-free standard gasoline according to Example 16. The fuel now had a heating value of 9660 Cal. Its octane number increased to RON 95 whereas the CO content decreased from 2.30 to 0.32 volumetric %. The tractive force of the engine decreased from 52 Kp (Cp) to 51 Kp (Cp).

EXAMPLE 20

Figure 3:
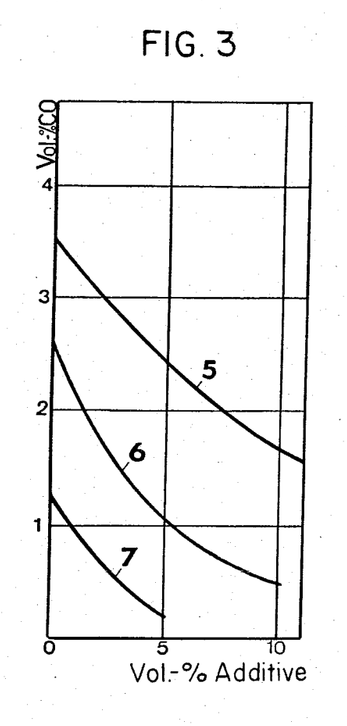
FIG. 3 shows the decrease in CO content in the exhaust gases of three different engines with increasing amounts of the additive of the present invention.

The graph of FIG. 3 of the drawing incorporates numerous tests in which the CO content of the exhaust gas with regard to the combustion of three different engines at full load was ascertained. The amount of the additive in volumetric % is indicated on the abscissa and the amount of CO determined in the exhaust gas on the ordinate. Curve 5 was determined with a 4 cylinder engine with an inverted carburetor, curve 6 with a 6 cylinder engine with a double carburetor and curve 7 with a 4 cylinder engine with thermal afterburning using one and the same gasoline.

The curves lead to the conclusion that on account of the additive according to the invention, in spite of differing amounts of CO in the exhaust gas owing to the different engines, approximately identical relative reductions in the CO content in the exhaust gas were obtained by using an additive according to the invention. As a result of the additive according to the invention the efficiency of constructional measures in the engine for the reduction of the CO content in the exhaust gas is considerably increased in all cases without considerable decreases in capacity having to be taken into account.

EXAMPLE 21

5 volumetric % of a mixture of
40 parts by volume methylal $(CH_3O)_2CH_2$
40 parts by volume methanol $CH_3OH$
20 parts by volume isopropanol $(CH_3)_2CHOH$
was added to a standard commercial gasoline having a boiling range of 35° to 200°C, a density of 0.731/15°C, an octane number RON 88 and a heating value of 10,100 Cal. The fuel now had a heating value of 9840 Cal. Its octane number increased to RON 88.9. The CO content in the exhaust gas decreased from 2.30 volumetric % to 1.27 volumetric %. The tractive force remained unchanged at 52 KP (Cp).

The nitric oxide content decreased from 4,600 ppm to 4,000 ppm, the aldehyde content from 20 to 11 ppm. Consumption increased by 0.13 liter per 100 kilometers.

EXAMPLE 22

5 volumetric % of a mixture of
40 parts by volume methylal,
40 parts by volume methanol
20 parts by volume isopropanol and in addition
1.25 volumetric % aniline
was added to a standard commercial gasoline such as the one according to Example 21. The mixture now had a heating value of 9840 Cal. Its octane number had risen to RON 92. The CO content in the exhaust gas decreased from 1.33 volumetric % to 1.08 volumetric %. The tractive force remained unchanged at 61 Kp (Cp). The nitric oxide content decreased from 4,600 to 3,820 ppm and the aldehyde content remained the same at 20 ppm.

EXAMPLE 23

10 volumetric % of a mixture of
40 parts by volume methylal,
40 parts by volume methanol
20 parts by volume isopropanol
was added to a standard commercial gasoline such as according to Example 21. The mixture now had a heating value of 9500 Cal. The octane number increased to RON 90.2. The CO content in the exhaust gas decreased at full load from 1.15 volumetric % to 0.60 volumetric %, without a load from 4.65 to 3.75 volumetric %. The tractive force remained unchanged at 81 Kp (Cp). The nitric oxide content decreased from 4,600 to 3,600 ppm, the aldehyde content from 20 to 10 ppm.

The following comparative tests were carried out to show the synergistic effect of the mixture:
a. 5 volumetric % methanol was added to a standard gasoline such as the one according to Example 21. At +8°C the mixture becomes cloudy and separates into parts.
b. 10 volumetric % isopropanol is added to a commercial super gasoline with a boiling range from 35° to 195°C, a density of 0.752/15°C, an octane number of RON 98 and a heating value of 10,000 Cal. The heating value now amounted to 10,260 Cal. The octane number increased to RON 98.8. The CO content in the exhaust gas decreases from 2.30 to 0.78 volumetric %. The nitric oxide content increases from 4,200 to 4,620 ppm. The aldehyde content increases from 18 to 30 ppm.

EXAMPLE 24

5 volumetric % of a mixture of 40 parts by volume methylal, 40 parts by volume methanol, 20 parts by volume isopropanol as well as 1.25 volumetric % monomethyl aniline was added to a lead free super gasoline which was not blended with any additives and which had a boiling range of 35° to 195°C a density of 0.754 at 15°C, an octane number RON 89 and a heating value of 10,450 Cal. The fuel now had a heating value of 10,340 Cal. Its octane number had increased to RON 96.5. At full load the CO content in the exhaust gas decreased from 1.37 volumetric % to 1.05 volumetric %. The nitric oxide content decreased from 5,100 ppm to 4,800 ppm, that of the aldehyde from 18 to 12 ppm. The tractive force remained unchanged at 61 Kp (Cp).

What is claimed is:

1. A fuel for use in internal combustion engines having a substantially constant heating value and providing a reduced amount of carbon monoxide in the exhaust gases of the engine comprising gasoline containing from 0.2 to 12 volume % of an additive comprising at least one oxygen-containing compound of the general formula (I)

wherein $R_1$ is H or $CH_3$ and $R_2$ and $R_3$ are each $CH_3$, $C_2H_5$, $C_3H_7$ or $C_4H_9$.

2. A fuel according to claim 1, wherein said additive contains 20 to 99.95 parts by volume methylal, 0 to 10 parts by volume dimethyl acetal, and further contains 0 to 60 parts by volume methanol, 0 to 40 parts by volume isopropanol, 0 to 10 parts by volume i-butanol and 0 to 30 parts by volume methylacetate.

3. A fuel according to claim 1, wherein said additive contains 50 to 90 parts by volume diethyl acetal and further contains 10 to 50 parts by volume isopropanol.

4. A fuel according to claim 1, wherein said additive contains at least three of said oxygen-containing compounds.

5. A fuel according to claim 4, wherein said additve contains 40 to 70 parts by volume ethyl formal, and further contains 20 to 40 parts by volume methanol and 10 to 30 parts by volume isopropanol.

6. A fuel according to claim 1, wherein said additive further contains from 0.0002 to 0.4 volume % water.

7. A fuel according to claim 1, further comprising from 0.02 to 4 volume % aniline or methylaniline.

8. A fuel according to claim 7, wherein said additive contains 33 parts by volume methylaniline, 19 parts by volume methanol, 6.7 parts by volume methylal, 19 parts by volume methyl acetate, 13.4 parts by volume isopropanol, 6.7 parts by volume paraldehyde and 2.2 parts by volume water.

9. A fuel according to claim 1, wherein the ratio of the partial pressure of said oxygen-containing compounds at all temperatures within the boiling range of said gasoline to the partial pressure of gasoline is substantially constant.

10. A fuel according to claim 1, wherein the boiling curve thereof is substantially the same as that of said gasoline.

11. A fuel according to claim 1, wherein said additive contains a mixture of 35 to 45 parts by volume methylal 35 to 45 parts by volume methanol 15 to 25 parts by volume isopropanol, and 10 to 125 parts by volume aniline or methylaniline.

12. A fuel according to claim 1, which is lead-free, and wherein said additive contains a mixture of

40 parts by volume methylal 40 parts by volume methanol 20 parts by volume isopropanol, and 25 to 65 parts by volume aniline or methylaniline.

13. An additive for fuel useful in internal combustion engines which provides a decreased amount of carbon monoxide in the exhaust gases from said engine comprising at least one oxygen-containing compound of the general formula (I).

wherein $R_1$ is H or $CH_3$ and $R_2$ and $R_3$ are each $CH_3$, $C_2H_5$, $C_3H_7$ or $C_4H_9$.

14. A fuel according to claim 1, wherein said additive contains a $C_1 - C_7$ acetal and at least two members selected from the group consisting of a $C_1 - C_7$ alcohol, a $C_1 - C_7$ acetal and a $C_1 - C_7$ acetate.

15. A fuel according to claim 1, wherein said additive is present in the amount of 0.5 to 10 volume %.

* * * * *